US007609819B1

(12) United States Patent
Tuttle

(10) Patent No.: US 7,609,819 B1
(45) Date of Patent: *Oct. 27, 2009

(54) SYSTEMS AND METHODS FOR DELIVERING PERSONALIZED STORM WARNING MESSAGES

(75) Inventor: Robert J. Tuttle, Ormond Beach, FL (US)

(73) Assignee: Emergency Communications Network, Inc., Ormond Beach, FL (US)

( * ) Notice: Subject to any disclaimer, the term of this patent is extended or adjusted under 35 U.S.C. 154(b) by 1007 days.

This patent is subject to a terminal disclaimer.

(21) Appl. No.: 10/892,788

(22) Filed: Jul. 16, 2004

Related U.S. Application Data

(60) Division of application No. 09/805,601, filed on Mar. 13, 2001, now Pat. No. 6,920,204, which is a continuation-in-part of application No. 09/124,697, filed on Jul. 29, 1998, now Pat. No. 6,324,262.

(60) Provisional application No. 60/079,454, filed on Mar. 26, 1998, provisional application No. 60/189,234, filed on Mar. 13, 2000.

(51) Int. Cl.
*H04M 11/04* (2006.01)
*H04M 1/64* (2006.01)

(52) U.S. Cl. .................. 379/40; 379/45; 379/88.12

(58) Field of Classification Search .............. 379/40, 379/45, 88.12
See application file for complete search history.

(56) References Cited

U.S. PATENT DOCUMENTS

| 4,356,348 A | 10/1982 | Smith | 179/1 MN |
|---|---|---|---|
| 4,539,436 A | 9/1985 | Theis | 179/6.04 |
| 4,667,065 A | 5/1987 | Bangerter | 379/351 |
| 4,692,817 A | 9/1987 | Theis | 360/12 |
| 4,941,168 A | 7/1990 | Kelly, Jr. | 379/69 |
| 5,371,787 A | 12/1994 | Hamilton | 379/386 |
| 5,404,400 A | 4/1995 | Hamilton | 379/386 |
| 5,430,792 A | 7/1995 | Jesurum | 379/67 |
| 5,444,767 A | 8/1995 | Goetcheus | 379/67 |
| 5,559,867 A | 9/1996 | Langsenkamp | 379/92 |
| 5,581,602 A | 12/1996 | Szlam | 379/67 |

(Continued)

*Primary Examiner*—Curtis Kuntz
*Assistant Examiner*—Joseph T Phan
(74) *Attorney, Agent, or Firm*—Brian S. Steinberger; Law Offices of Brian S. Steinberger, P.A.

(57) ABSTRACT

ThunderCall is a computer based system for delivering NWS (National Weather Service) severe weather warnings as a message (personalized information, if desired) via an automated dialing system to live persons and to automated recorders comprising the steps of: forming a database of names with their respective geographic locations; capturing a NWS Bulletin reciting the location of a severe storm; validating a relevant Bulletin into a Valid Bulletin by determining from the storm's location that it represents an imminent severe storm danger to at least one person of said database (capable of 10,000,000 or more persons) recording, if desired, an individual personal urgent warning to the name of the intended recipient of the Valid Bulletin; combining, if desired, said personal warning with a generic severe storm warning for said recipient; and, sending said Valid Bulletin with said combined warnings to said person whereby he is alerted within seconds of the release time of said National Weather Service bulletin to the danger of said storm. The storms can include but are not limited to warnings for tornados, severe storms, hurricanes, winter storms, and other impending storms, and the like, and can be delivered to answering machines, live telephone recipients, PC screens, and can further shut down electrical equipment such as PCs.

5 Claims, 12 Drawing Sheets

U.S. PATENT DOCUMENTS

| | | | |
|---|---|---|---|
| 5,644,624 A * | 7/1997 | Caldwell | 379/69 |
| 5,644,625 A | 7/1997 | Solot | 379/88 |
| 5,652,784 A | 7/1997 | Blen | 379/67 |
| 5,724,420 A | 3/1998 | Torgrim | 379/372 |
| 5,768,358 A | 6/1998 | Venier | 379/207 |
| 5,787,151 A | 7/1998 | Nakatsu | 379/67 |
| 5,790,019 A * | 8/1998 | Edwin | 340/506 |
| 5,799,066 A | 8/1998 | Joyce | 379/88 |
| 5,901,214 A | 5/1999 | Shaffer | 379/220 |
| 5,917,887 A * | 6/1999 | Fesler et al. | 379/48 |
| 5,943,410 A | 8/1999 | Shaffer | 379/213 |
| 6,002,748 A * | 12/1999 | Leichner | 379/48 |
| 6,021,177 A * | 2/2000 | Allport | 379/48 |
| 6,067,348 A * | 5/2000 | Hibbeler | 379/88.16 |
| 6,121,885 A * | 9/2000 | Masone et al. | 340/628 |
| 6,345,250 B1 * | 2/2002 | Martin | 704/260 |
| 6,404,880 B1 * | 6/2002 | Stevens | 379/221.11 |
| 6,452,492 B1 * | 9/2002 | Drury | 340/533 |
| 6,678,358 B2 * | 1/2004 | Langsenkamp et al. | 379/69 |
| 6,745,021 B1 * | 6/2004 | Stevens | 455/404.1 |
| 6,912,270 B1 * | 6/2005 | Drury et al. | 379/51 |
| 7,174,005 B1 * | 2/2007 | Rodkey et al. | 379/88.12 |

* cited by examiner

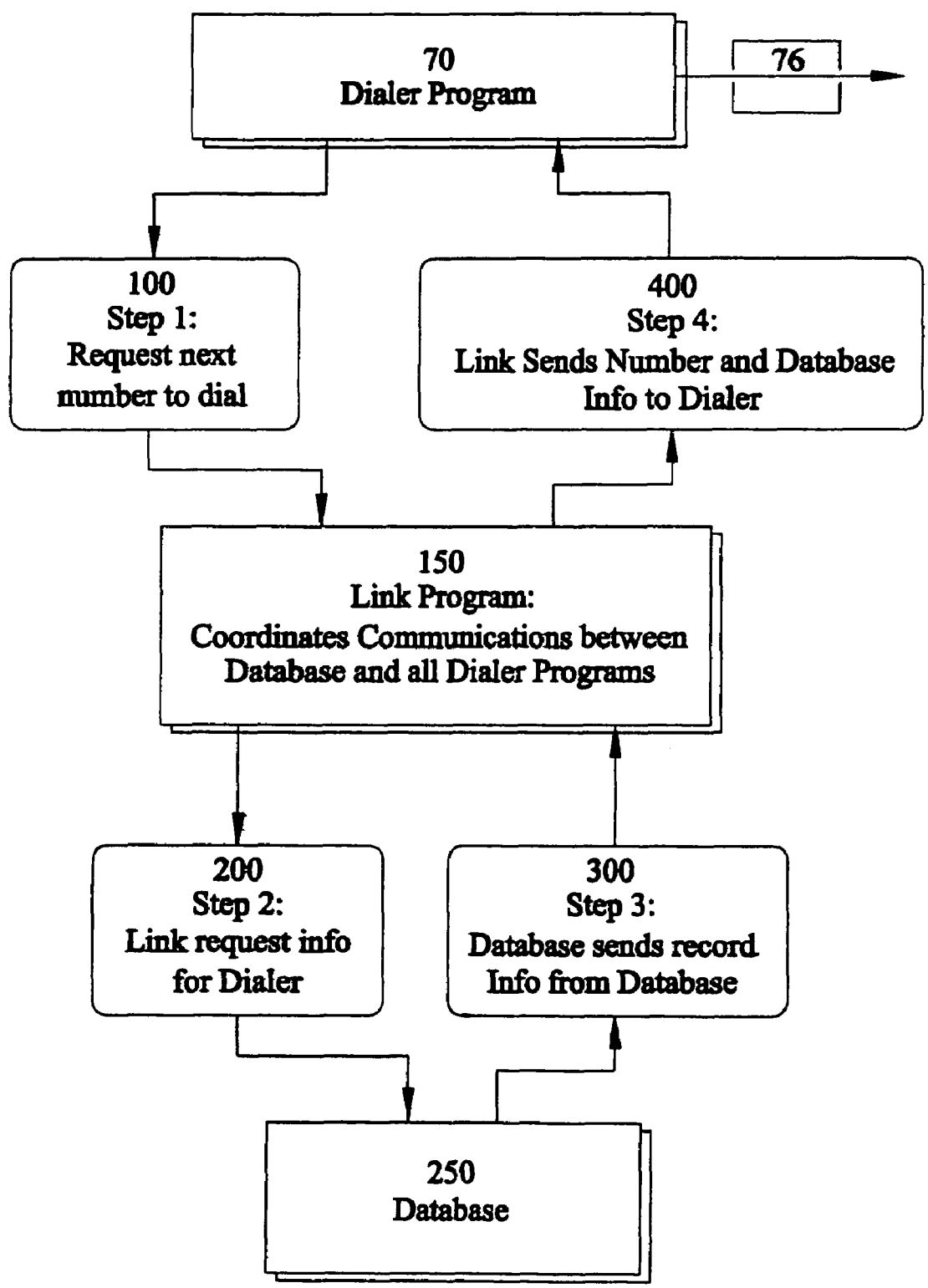

SAMPLE BULLETIN

This is an automated ThunderCall weather warning. Moments ago, the National Weather Service issued a tornado warning for your area. Again, within the last few seconds, a tornado warning has been issued for your area. Please take immediate action and move to a secure location for your protection. This tornado warning is a service of ThunderCall, 1-888-THUNDER.

Fig. 9

SYSTEMS AND METHODS FOR DELIVERING PERSONALIZED STORM WARNING MESSAGES

This is a Divisional Application of Ser. No. 09/805,601 filed Mar. 13, 2001 now U.S. Pat. No. 6,920,204 which is a continuation In Part of Ser. No. 09/124,697 filed Jul. 29, 1998, now U.S. Pat. No. 6,324,262, which claims the benefit of priority of U.S. Provisional Application 60/079,454 filed on Mar. 26, 1998 which also claims the benefit of priority to U.S. Provisional Application 60/189,234 filed on Mar. 13, 2000.

FIELD OF THE INVENTION

This invention relates to telephone message systems and related methods, and in particular to computer system and method where severe weather conditions are automatically communicated to subscriber telephones whereby safety procedures can be undertaken before the weather reaches the subscriber's area.

BACKGROUND AND PRIOR ART

Group emergency call systems are intended for use by volunteer fire personnel, civil defense, or other groups requiring quick and simultaneous distribution of a message from a single individual to a number of other individuals. This service has historically been used in rural areas to provide one-way communication from a control position to a reselected group or groups of individuals. The traditional method of providing this service has been to install an adjunct switching system in the central office exchange that is cross-connected to lines dedicated for emergency use by the group emergency call system. Examples of such prior art cross-connected adjunct or add-on systems are the 291 Emergency Reporting System by Tellabs Inc., and the Emergency Out Dial System manufactured by Message Processing System, Inc. Such prior art systems suffer from the disadvantages of being expensive and complex, and requiring external maintenance terminals and sophisticated electronic equipment. Furthermore, such add-on emergency group call systems are incapable of providing standard central office or PBX call functions such as automatic call forwarding from an emergency hunt group subscriber set to a further set in the exchange. For example, the aforementioned 291 Emergency Reporting System utilizes a siren for notifying subscribers whose sets have been placed in call forward or do-not-disturb modes as well as rural areas and small towns who have been devastated in recent years by severe weather conditions.

Communicating messages by telephone has increased tremendously in the past decade. Communicating information such as advertisements and public announcements has become very important. Leaving pre-recorded messages to subscribers has become a popular technique for communicating information to thousands of individuals and businesses. There have many problems associated with leaving pre-recorded messages. For example, many pre-recorded messages are not noted immediately because the recipients do not quickly respond to the pre-recorded message and/or the pre-recorded messages are not correctly received by the answering machines. Thus, it has become more popular than ever in the communicating of messages to use computers, which will detect conditions that an answering machine is receiving the call.

Attempts have been made over the years to overcome the problems with delivering messages to telephone answering machines. See for example U.S. Pat. Nos. 4,667,065 to Bangerter; 4,941,168 to Kelly, Jr.; 5,371,787 to Hamilton; 5,430,792 to Jesurum et al.; and 5,581,602 to Szlam et al. However, these patents are generally limited to sensing audio signals generated by the answering machines and do not cover all the types of answering machines which start recording after different selected delay times. For example, many of these devices commence playing a recorded message based on mistakenly detecting when the "beep" has occurred. The false "beep" signal is a common problem for real callers trying to leave messages on answering machines. Furthermore, these patents do not fully analyze the connected calls in order to utilize preselected delay times to deliver and fully play recorded messages which is of vital importance when delivering emergency messages warning of the approach of severe weather conditions which can endanger human life.

Message delivery systems, which deliver a recorded message to an answering machine, must solve the problem of determining when to "Launch" (begin playback of) the pre-recorded message. Conventional systems rely on a timer to determine the moment to begin playback of the recorded message which systems experience a high percentage of truncation of the recorded message. Other serious problems includes: the called answering machine may disconnect the call due to prolonged silence before the message playback begins; failure to listen to the message since pre-recorded messages oftentimes do not personally address the individuals being called; and generally ignoring important messages such as when the message is dealing with imminent dangerous weather conditions and other imminent dangers, and the like.

Other patents of general message communication interest include, U.S. Pat. Nos. 5,404,400 to Hamilton; 5,444,767 to Goetcheus et al.; 5,652,784 to Blen et al.; and 5,787,151 to Nakatsu et al. However, none of these patents solve all of the above problems.

Although the above has dealt with the problems relating to pre-recorded messages introduced onto an answering machine, it is further essential that a severe weather warning of imminent danger to area where the intended recipient is present and/or has an interest in monitoring be provided. There have been extensive efforts by the United States National Weather Service to warn of emergency weather conditions. The National Weather Service broadcasts weather and weather emergencies across the United States using seven different regional weather channels. These seven channels range in frequency from 162.4 to 162.55 MHz and employ narrow band FM modulation. When a regional weather emergency exists, the weather service modulates a 1050 Hz tone on the appropriate 162 MHz weather frequencies for 10 seconds to alert the public of an impending weather emergency. However, the 1050 Hz tone will not be heard by anyone who is not listening to a radio tuned to that local weather channel at 162 MHz, at the time of the emergency. Additionally, individuals will only be warned of weather events occurring within their immediate signal broadcast range. If an individual needed to be alerted to severe weather events taking place hundreds of miles away, for example individuals with elderly relatives in a distant city or a person monitoring the conditions at a distant ranch containing livestock, the National Weather Service broadcasts in those areas would not reach their location, and therefore no warning would be communicated.

One approach to this non-reception problem is to implements a weather radio receiver into a cordless telephone system to allow a user to hear the National Weather Service broadcast over the cordless telephone. A control allows the user to listen to the regional weather broadcast either from the base unit or from the handset unit. When a weather emergency exists, a 1050 Hz tone transmitted by the weather service will be announced through the base unit speaker as well as through the handset unit speaker regardless of whether the user is listening to the regional weather broadcast or is on the telephone at the time of the emergency (see U.S. Pat. No. 5,541,980)

There still represents a serious need to provide a rapid response system to directly alert one who is interested in protecting the lives of oneself, oneself and property from threatening severe weather conditions such as tornadoes, hurricanes, lightning, hailstorms flash floods and windstorms by a warning system which delivers a severe storm warning alertly to the personal telephone or other communication system which can protect life and/or property for 24 hours a day.

SUMMARY OF THE INVENTION

The primary object of this invention is to provide a computer based system of delivering severe weather warnings within seconds of a National Weather Service bulletin release to individuals.

The secondary object of this invention is to provide a computer based system of delivering severe weather warnings to telephones within seconds of a National Weather Service bulletin release to individuals.

The third object of this invention is to provide severe weather warnings to telephones directly to homes and businesses.

The fourth objective of the present invention is to assure subscribers all will be notified at all times whenever bad weather represents an imminent danger to their homes and businesses.

The fifth object of this invention is to provide severe weather warnings to telephones as the weather evolves directly to homes and businesses.

The sixth object of this invention is to provide a severe weather warning telephone dialing software message delivery system to subscribers having a local ZIP code identifier or other standardized geographic identifier, such as National Weather Service "Zones".

The invention encompasses three embodiments. The first embodiment encompasses delivering pre-recorded personalized severe storm warning messages. A database includes all subscribers to the Thundercall severe storm warning system and the location designation of each. The invention checks the subscriber location database to see if any severe storm area defined by the NSW release is in imminent danger, e.g. having been denoted as a "WARNING" event, (as opposed to a "Watch" event) and if found then immediately warns all subscribers within the location of danger.

The second embodiment encompasses using the RealCall invention of the parent invention for delivering pre-recorded personalized severe storm warning messages after an answering machine has been detected and launches the pre-recorded recorded warning message. RealCall replaces the pre-set timer controls of the prior art devices with an "interactive" logic, where the invention "listens" to the answering machine's outgoing message and waits for a condition suggesting that the answering machine is in "record" mode. RealCall tests for the "record" mode condition by continuing to "listen" to the call for confirmation before starting to launch. As a result, the time interval from the moment the call connects until RealCall "launches" a message is different for each call placed by the RealCall system. The novel RealCall invention is a next level that comes into play after the system has detected whether the received call in the dialer system has reached a live person or an answering machine. Such a system is described in reference to U.S. Pat. No. 5,371,787 to Hamilton, which is incorporated by reference. The RealCall portion of the invention uses dual two tier steps after determining an answering machine has been reached. One two tier approach determines if a solid non human tone of at least one second duration is detected in the connected call and then playing the recorded information message only after the tone has been followed by a preselected interval of silence The other two tier approach determines if silence of at least two seconds is detected in the connected call (in lieu of the indication of a solid non human tone of at least one second duration) and then playing the recorded information message only after another one second interval of silence has been detected. The system allows for the delivery of a complete severe storm warning message in a nontruncated form onto the answering machine within approximately two to three seconds of the start of the answering machine's recording step without allowing the machine to cut-off the complete pre-selected message during the recording. Unlike the limitations in the prior art systems, the novel invention can be used with all types of answering machines such as, but not limited to a tape machine, a digital machine, a pager, a telephone provider voice/memory call machine, and a cellular machine.

The third embodiment of the invention is a communication system where the information delivered of a severe storm warning provokes previously designated action on part of the subscriber's equipments to shutdown electronic equipment such as computers and associated equipment, all electrical power to the subscriber's power and disconnecting all telephone circuitry. In this embodiment, storm warning messages can be delivered to the active screen of the PC user, and/or warn of the impending shut down of the PC equipment and/or warn that electrical equipment, telephone connected equipment, and the like, should be shut down.

The first and second embodiments can be combined together so that the RealCall system works in conjunction with delivering personalized greetings to the person being called.

Further objects and advantages of this invention will be apparent from the following detailed description of a presently preferred embodiment which is illustrated schematically in the accompanying drawings.

BRIEF DESCRIPTION OF THE FIGURES

FIG. 6A is a flowchart of the dialer program portion steps 1-4 of the novel telephone dialing software message delivery system invention of FIG. 5.

FIG. 9 illustrates a tornado warning bulletin for use in the subject invention.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Figure 1:
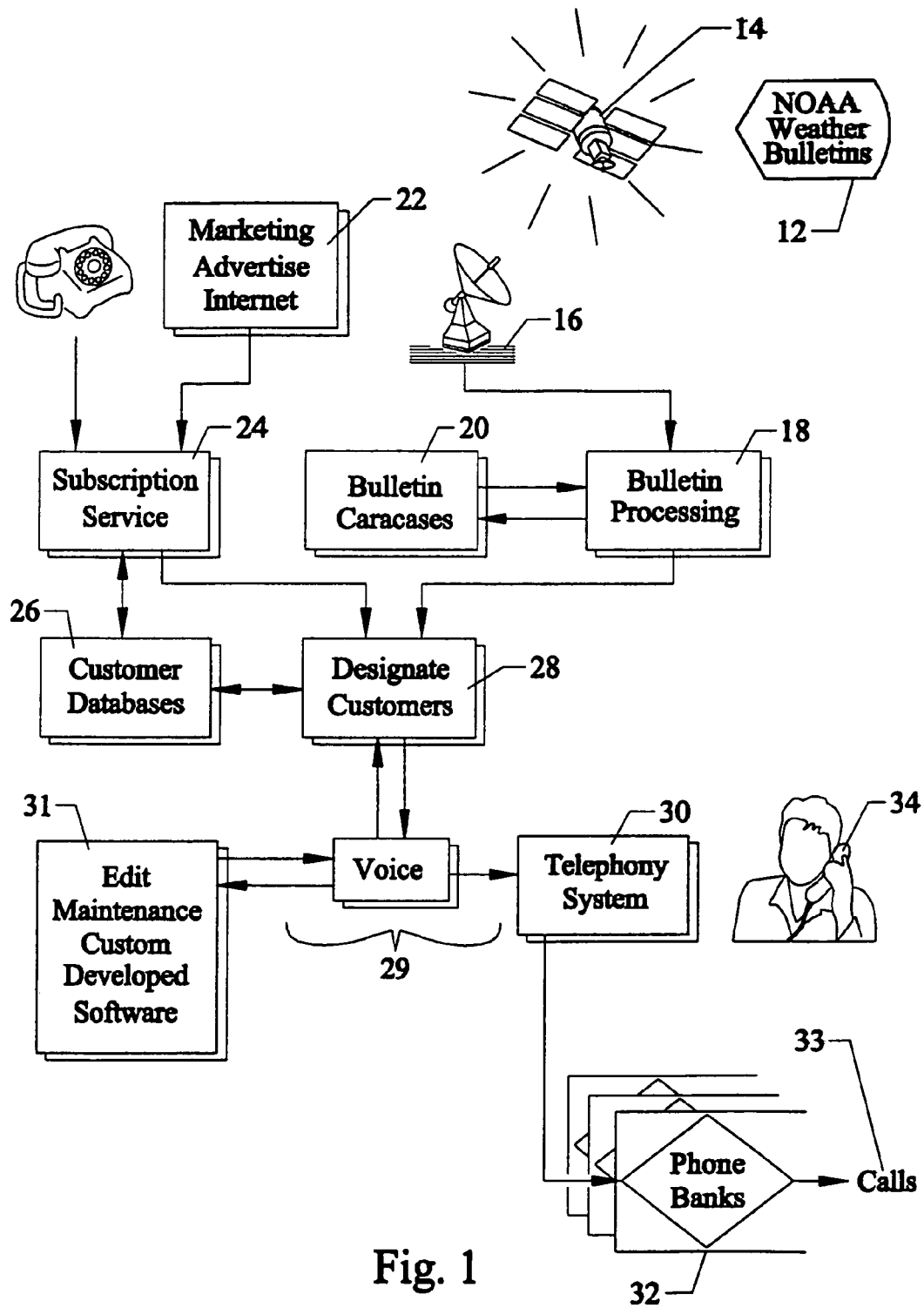
FIG. 1 illustrates a system diagram illustrating the novel Thundercall telephone severe weather warning message delivery system invention.

FIG. 1 diagrammatically illustrates the system of Thunder-Call by means of which the NOAA weather Bulletins 12 which are obtained from the GEOS-8 East Weather Satellite 14 by the satellite receiver 16 and thereafter processed into a bulletin by interaction with a bulletin database 20. By advertising on the Internet 22 and obtaining there from subscriptions service 24, the system develops a customer database 26 which holds the names and pertinent information of subscribers. The bulletin processing 18 interacts with the designate customers 28 determined by location from the database 26 and communicate the severe storm warning through the telephony subsystem 30 (shown in detail in FIG. 10.). Its voice output 29 is sent to the numerous phone banks 32 for transmission to the customers 34, and the voice messages can be edited and maintained through edit and maintenance software.

Figure 2:
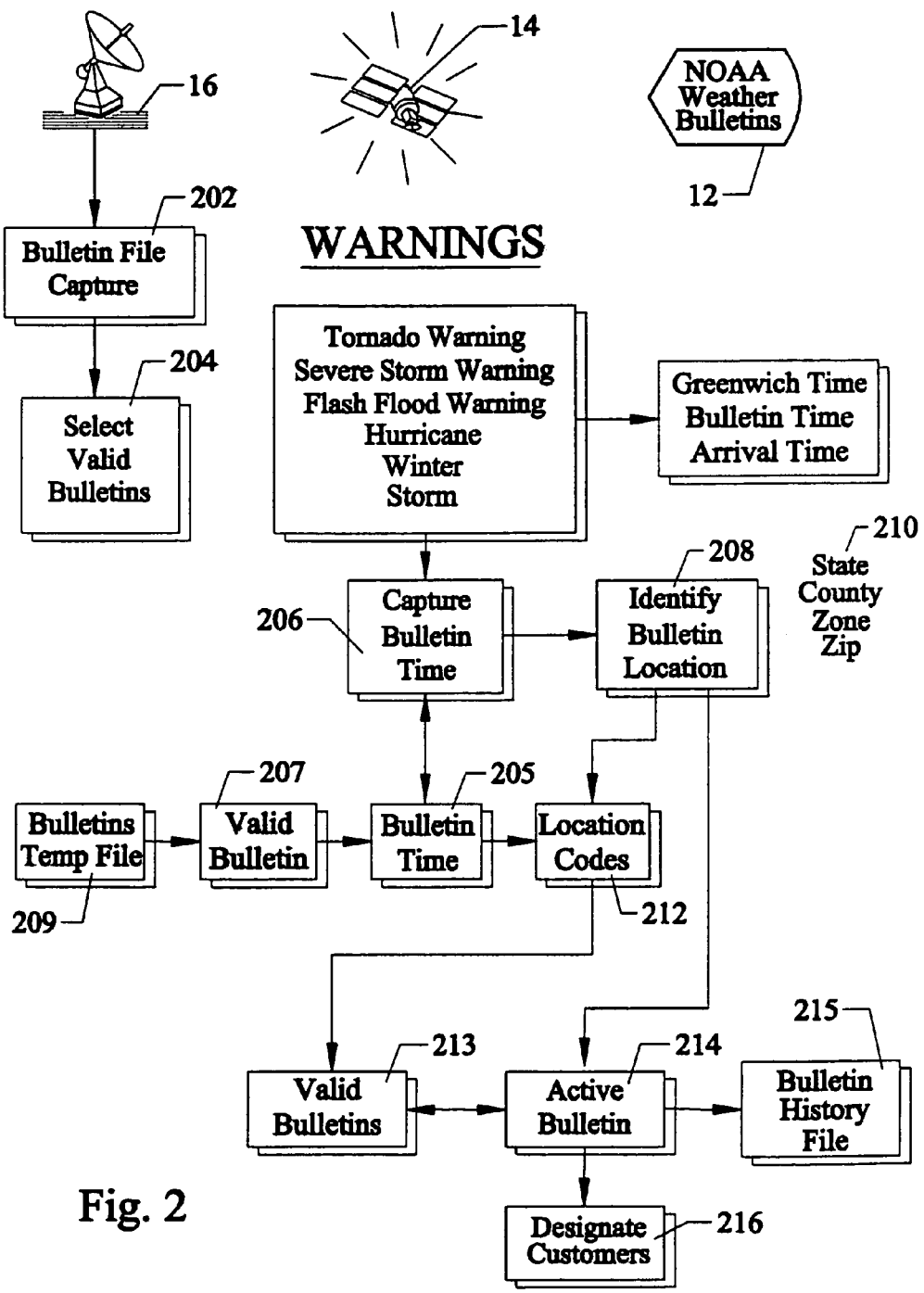
FIG. 2 is a chart illustrating the subsystem for processing of a severe weather warning bulletin to a customer at a designated location found to be in imminent danger of said severe weather.

Referring now to FIG. 2, it shown there in diagrammatic fashion of how NWS information from the satellite receiver 16 provides for bulletin file capture 202 from which the relevant valid bulletins 204 are captured at step 206 with the time noted from bulletin time module 205 and thereafter identified as relevant at step 208 by using its location (State, County, Zone, ZIP) 210 in comparison with the location codes 212 of the customers and establishment that it is a Valid Bulletin at module 213. Having identified relevant Bulletins, the system designates it as an Active Bulletin 214 which severe storm weather bulletin 214 is sent to the designated customers 216 alerting each to imminent life endangering climatic conditions and to Bulletin History File 215 which provides information as to the likelihood of various severe storms at any of a multitude of locations. The Selected Valid Bulletins 204 are stored as Valid Bulletins 207 and also temporary stored with all Bulletins at 208 captured by Bulletin File 202.

Figure 3:
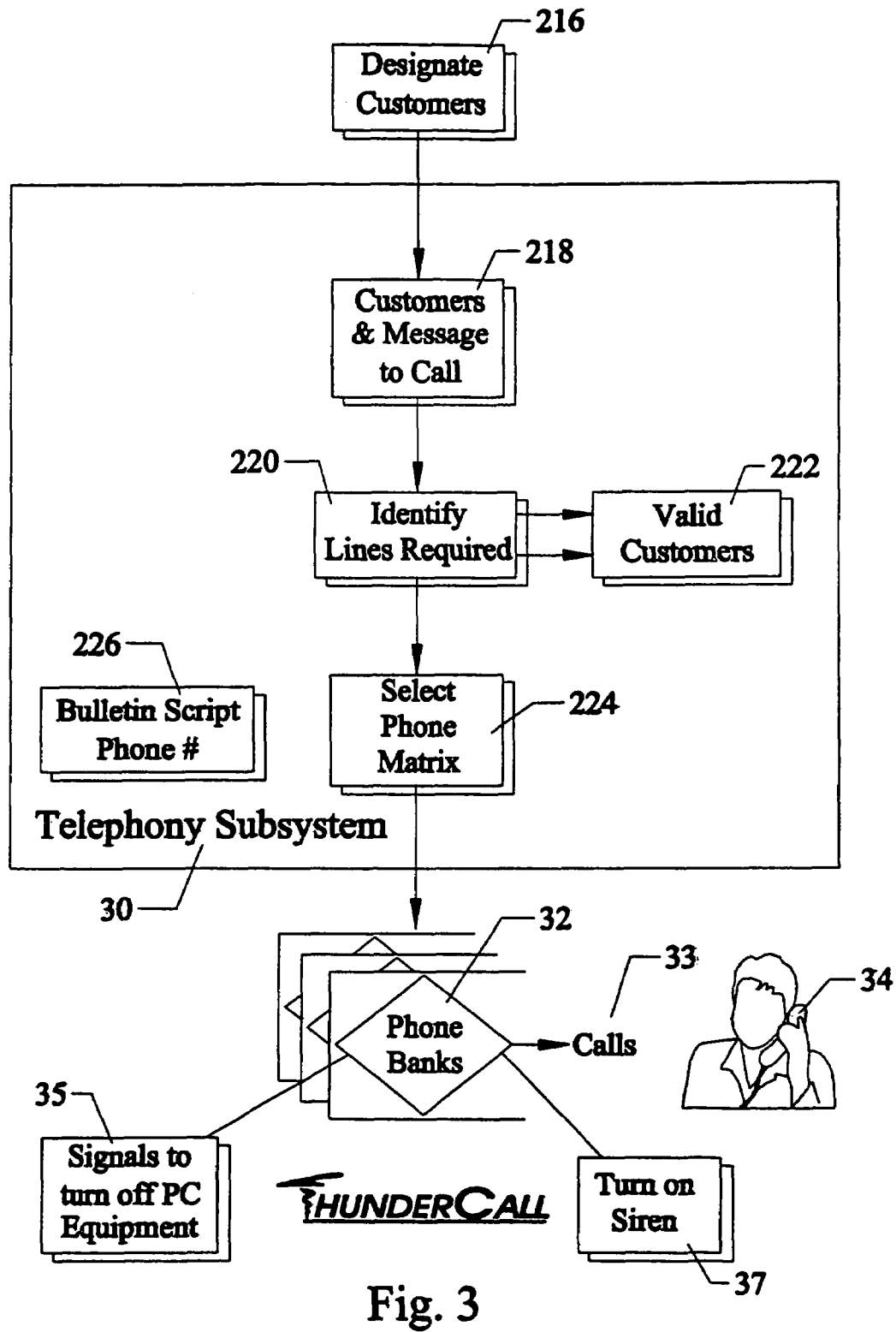
FIG. 3 diagrammatically illustrates the telephony subsystem that can be used for the invention.

FIG. 3 sets forth in block form how the telephony subsystem 30 of FIG. 1 functions with the designated customers 216 of FIG. 2. When the NWS weather Bulletin 12 is transmitted to the Bulletin File Capture 202 as shown on FIG. 2, the identity of the Bulletin Location 208 and thereafter processed into an Active Bulletin 214 which further establishes the Designate Customers 216 which are to be advised of the imminent danger of the approaching severe storm. The customers to be called and the message to be sent to them 218 is analyzed to determine and identify the telephone lines required 220 by interrogating the database as to valid customers 222. The next step is to select the phone matrix 224 based on input from lines required 220 and the valid customers of the database 222. Input to matrix 224 comes from stored data of the Bulletin message script and phone number 226. This composite information to be later discussed flows into phone banks 32 numbering 864 as seen at 33 to be subsequently communicated to customer 34.

In addition to severe storm weather telephone messages including voice messages, there are other procedures which could take place including: the transmission of a specific sequence of DTMF tones or other signals 35 which could first alert the subscriber and a second signal to initiate an automatic shut down of the PC equipment; a signal could be sent through the line to activate a self powered siren 37 to alert anyone within hearing that a severe storm was approaching. Additionally, an interrupt page could appear on the screen of the PC user warning them of the storm warning message.

FIG. 3 illustrates the preferred setup of the THUNDER-CALL severe weather early warning service that will call your telephone and deliver a pre-recorded message within seconds after a warning is issued by the NWS for your area. A severe weather alert is sent by NWS via satellite 302 which is captured by satellite equipment 304 which alert is processed by computers having a location database 308 and if a warning is required from location of relevant customers from said database 308, the appropriate subscribers are selected 310 and THUNDERCALL warnings are delivered 312 are rapidly delivered to customers telephones 314.

This main computer system 306 includes a PC such as an IBM compatible PC having 200 MHZ or higher, with Pentium processor and the like, including a standard harddrive, 14" or greater color monitor, mouse and keyboard for input. PC 15 is connected to a Telephony Hardware 20 such as but not limited to an Analog/Digital Multi Channel Telephony card such as the Dialogic D41D (Analog), D240SC-T1 and D/240SC-T2 (Digital), and the like. The CT hardware can be a 12" computer card used in the computer 306 and includes the following features of playing voice messages to a caller, digitizing and recording voice signals, connecting directly to telephone lines, and placing outbound calls and reporting the results of the calls. The Dialogic Computer Telephony (CT) card model no. D/240SC-T1 and D/240SC-T2 can allow twenty-four (24) telephone lines to operate through a single digital T1 connection. The software uses multitasking OS (Windows 2000 or Windows NT or similar), and can be developed with programming language software such as but not limited to C++, Visual Basic, Delphi, and the like. Software further uses a Custom Control software for control of the CT hardware. Programming languages (i.e. Microsoft's Visual Basic) provide a conduit for programmers to access a computer's built in capabilities. Programming languages refer to code which accesses specific capabilities, such as viewing the contents of a hard drive, or playing sound files over a computer's sound card as CONTROLS. The Custom Control software 30 are controls which are not provided part of the programming language, but are typically developed by third party software developers.

The software further uses database software for maintaining the calling lists, such as but not limited to Microsoft Sequel Server, Dbase, Foxpro, and the like. The calling lists in the RealCall invention contain at least the following: phone number (approximately 10 digits), geographic area indicator (such as ZIP code), message file name(s), call history field, connect time field, record number (unique), date and time of call, and last call status. Although not required, the calling lists can contain additional information such as but not limited to names, addresses, past consumer behavior, and the like.

Along with the telephony CT hardware and software is the telephone service of the telephony subsystem 30 such as but not limited to Analog (RJ11-RJ14) interface, Digital (T1) interface and the like, which comes from the telephone service provider. The telephone service provider, such as but not limited to BellSouth and MCI, provides access to the network of telephone lines linking all telephones across the United States.

A telephone carrier connects automatically dialed calls from main computer system 306 to deliver messages to the remotely located answering machines 314, and the CT hardware monitors the call status. For example, ellSouth can provide a "Dial Tone" service, (which can be required by some CT hardware) and MCI can provide digital T1 service (no dial tone). Both BellSouth and MCI can provide a "Switching" capability, wherein each call can be routed over any available wire network to deliver the call to the appropriate telephone.

The telephone system of this invention can successfully interpret both traditional answering machines (tape and digital) as well as answering services such as but not limited to BellSouth's "Personal Voice Mail" and "Memory Call" as well as cellular phone answering services such as "Mobile Memo" and pager messaging services. The RealCall invention can work with any answering system, which plays a voice message and then records the caller's message.

Figure 5:
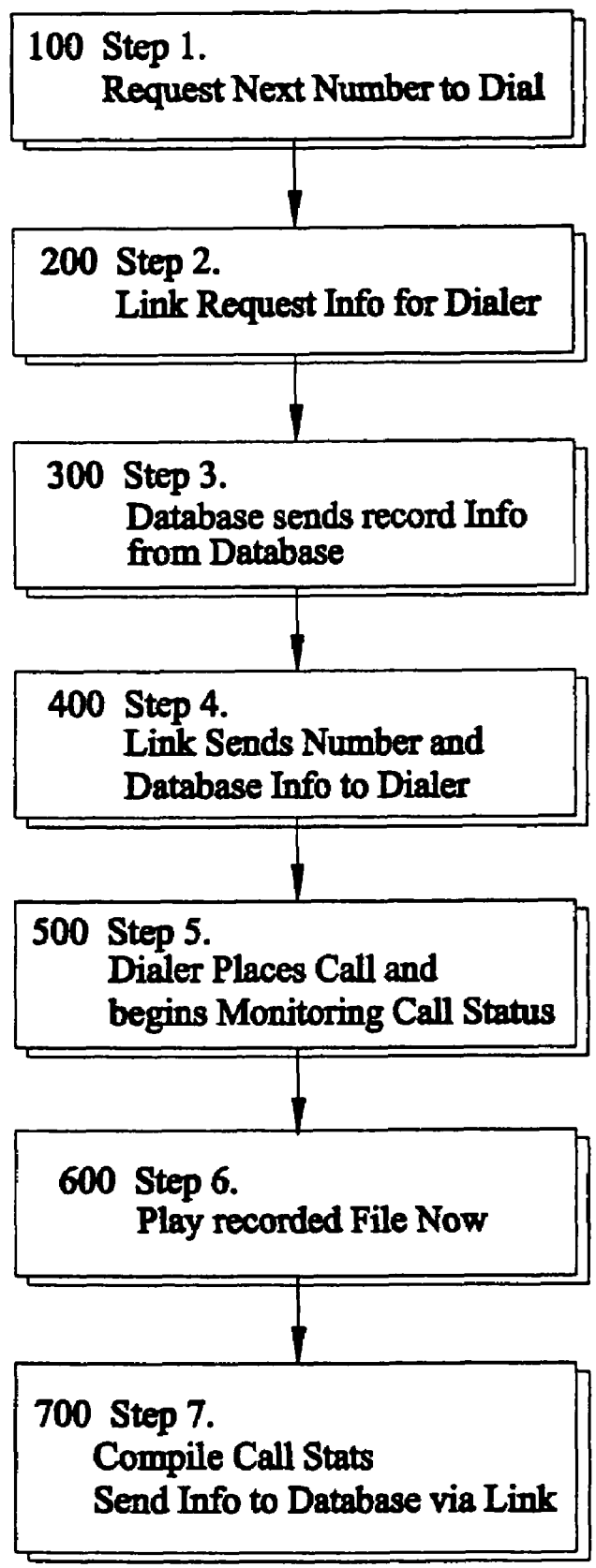
FIG. 5 is a chart of the seven (7) steps used in the novel telephone dialing software message delivery system invention of FIG. 3.

FIG. 5 is a chart 7 of the seven (7) steps used in the preferred novel telephone dialing software message delivery system 30 of FIG. 1. The seven (7) steps cover the interaction between a novel dialer program and a link program, which is shown in greater detail in reference to FIGS. 6A-6C. The first four steps can be accomplished by the Dialogic systems covered under U.S. Pat. Nos. 5,371,787 (machine answer detection); 5,638,436 & 5,450,484 (voice detection); 4,979,214 (speech recognition); 5,404,400 (outcalling apparatus) and 5,764,759, all of which are incorporated by reference. Other dialing systems can be used which initially determine when an answering machine has been detected through step 400.

An overview of the seven (7) steps will now be described. Referring to FIG. 5, the first Step 100, the Dialer program requests the next (telephone) number to be dialed from the "Link program" which has access to the calling database in the main computer 306. The "Dialer" step 100 is responsible for dialing a telephone number, determining the status of the call and delivering the recorded message of the severe storm warning at the appropriate time. For example, each phone line is monitored by the Dialer program step. In the second Step 200, the Link requests info for the dialer step from a database of phone numbers. A novel Link program insures that individual phone numbers are dialed only once. The Link program is the only program which communicates with the database of phone numbers directly. Each dialer program submits requests for new phone numbers to the Link, which processes these requests in the order received and retrieves information from the database of phone numbers on behalf of each dialer program. In addition, the Link program updates the database with completed call statistics, which are communicated to the Link program from each Dialer program as calls are completed. The purpose of the Link program is to avoid system resource problems, which can occur when hundreds of Dialer programs attempt to simultaneously communicate with a database directly. Third Step 300 has the database send record info from the database to the Link. And the Fourth Step 400 sends the database Info to the dialer.

The subject invention novelty comes into play with the Fifth Step 500 in FIG. 5. Fifth Step 500 has the dialer place the call and begins monitoring call status. The call status can include whether the call connected to an answering machine, busy signal, reached a Facsimile tone, no answer, and the like. Sixth Step 600 plays the recorded file, and the seventh Step 700 compiles call stats (statistics) and sends the information to the database 308 in main computer 306. After a call is completed, the novel program software updates each record with the result statistics (stats) of the call. The stats can include the disposition of the call (delivered to a live person or delivered to an answering machine), the length of connect, the call status, the time of day, and the like.

Figure 6B:
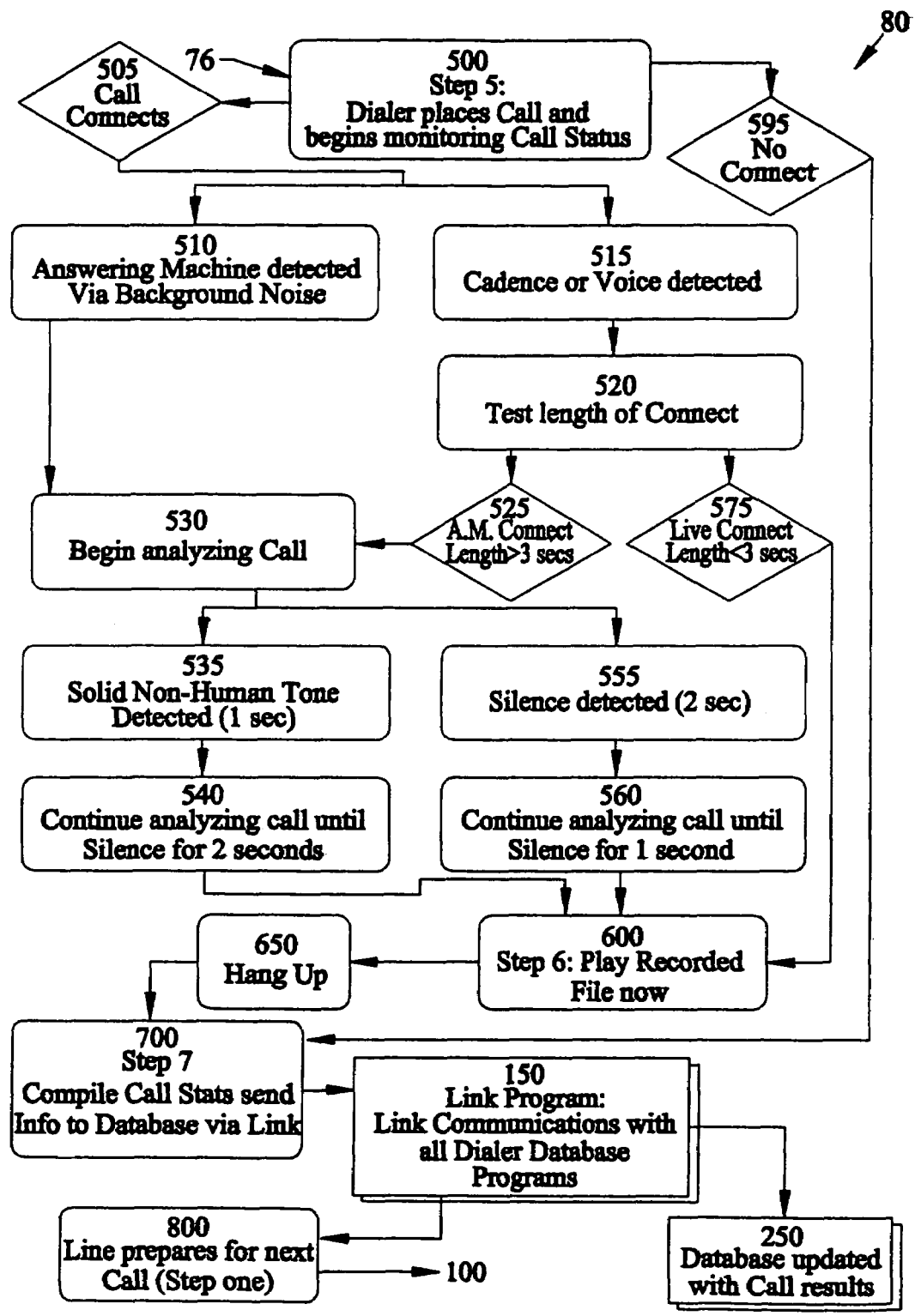
FIG. 6B is a flowchart of the dialer placing call and monitoring portion steps 5-7 of the novel telephone dialing software message delivery system invention of FIG. 5.
Figure 6C:
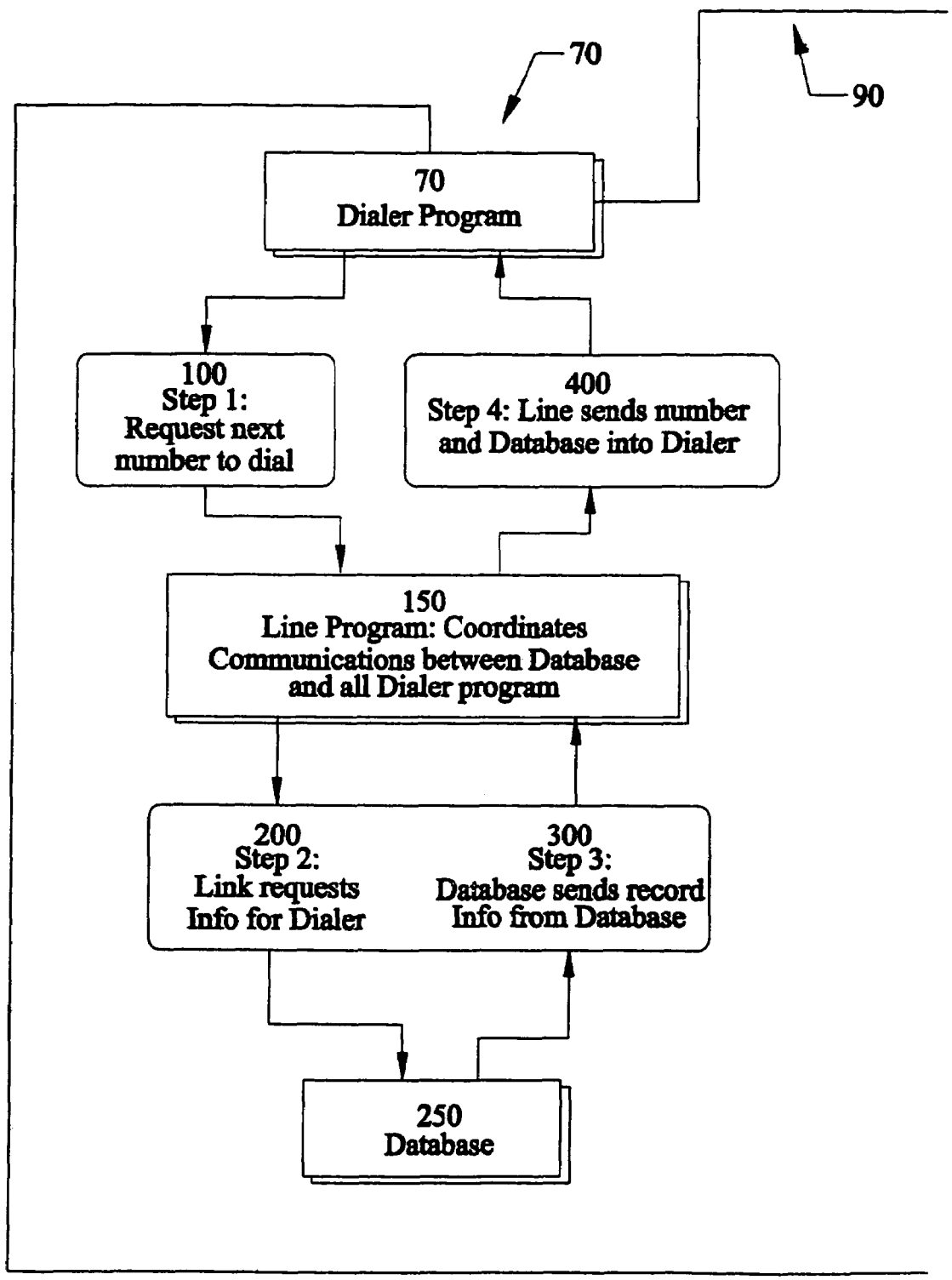
FIGS. 6C and 6D is an overview of the entire flowchart process of the novel telephone dialing software Message delivery system invention of FIGS. 5 and 6A-6B
Figure 6D:
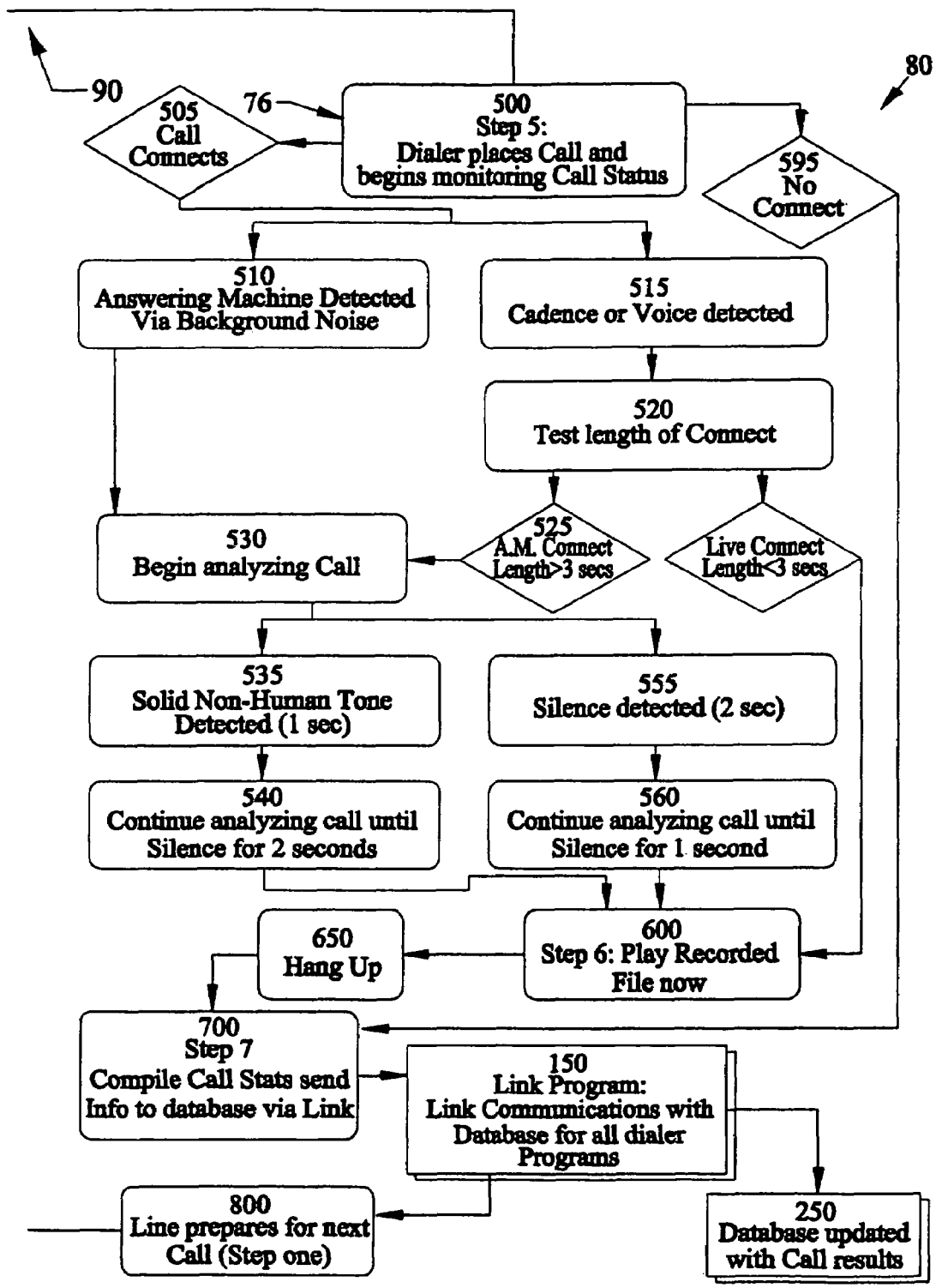

FIG. 6A is a flowchart 70 of the dialer program portion steps 14 of the novel telephone dialing software message delivery system invention of FIG. 5. FIG. 6B is a flowchart 80 of the dialer placing call and monitoring portion Steps 5-7 of the novel telephone dialing software message delivery system invention of FIG. 5, and will be explained in greater detail later. FIG. 6C is an overview of the entire flowchart process 90 of the novel telephone dialing software message delivery system invention of FIGS. 5 and 6A-6B. FIGS. 6A-6C are further explained in detail in U.S. patent application Ser. No. 09/124,697 to the same inventor and assignee of the subject invention, which is incorporated by reference.

Figure 4:
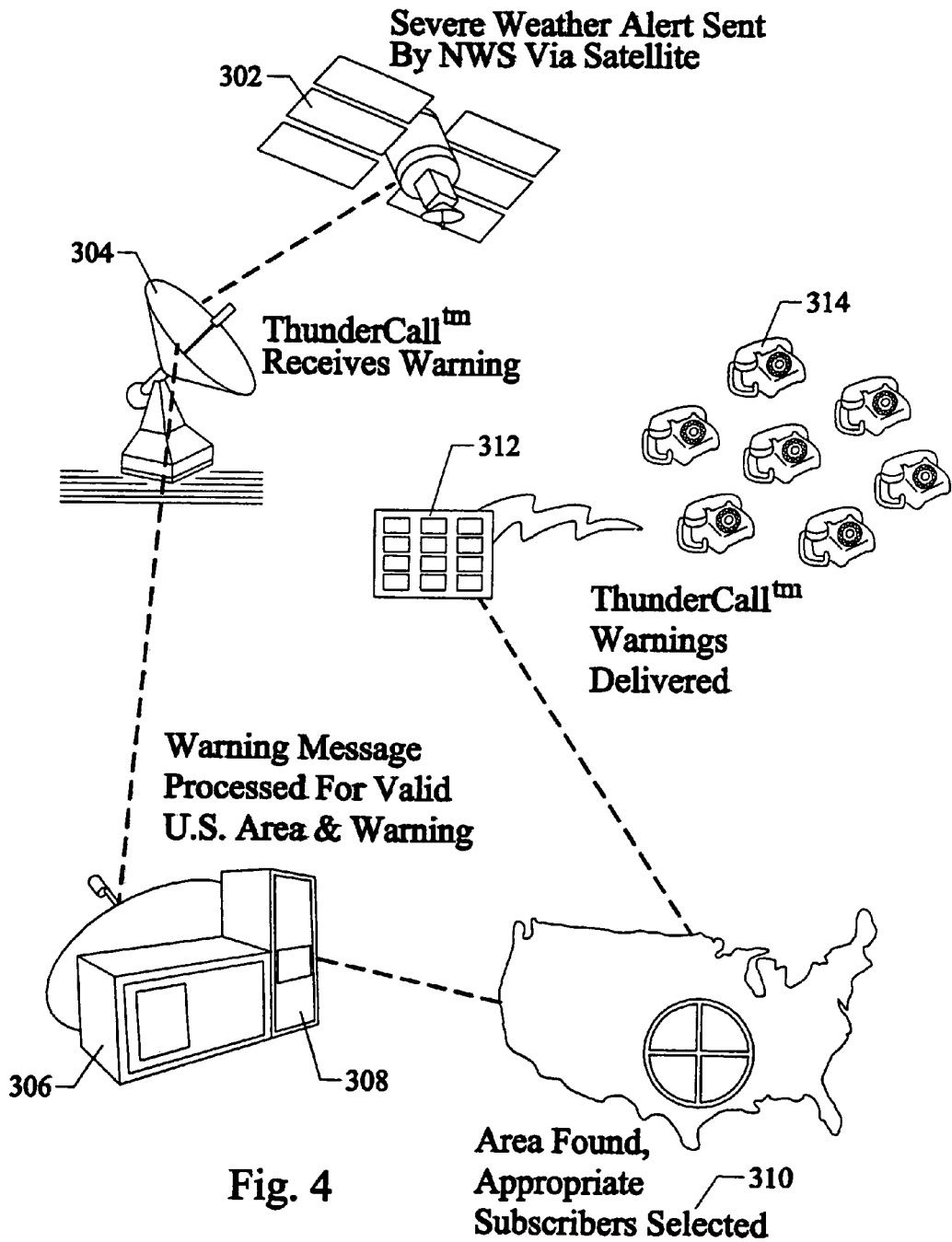
FIG. 4 illustrates a preferred setup using the novel severe weather warning message delivery system of the invention.

Referring to FIGS. 6A and 6C, the dialer program 70 initiates the first Step 100 which requests the next telephone number to dial and uses the link program 150 to communicate to the second Step 200 which is the link request for information for the dialer from the database 250 (aka 308 of FIG. 4). Third Step 300 has the Database 250 send record information to the Link program 150 to the fourth Step 400 which is a process that sends the telephone and Database information from the Link program to the dialer program 70 and to the flowchart shown in FIG. 6B. When the Dialer program 70 requests a new number to call, the Link program 150 sends the Dialer program 70 the following bits of data: a telephone number, the name of the recorded severe storm warning message(s) to play once connected, and the unique number of the subscriber. When the Dialer program 70 has completed a call it sends to the Link program 150 the following: recorded number of completed call, call length and the results of the call. The first five Steps 100, 200, 300, 400 and 500 of FIGS. 6A-65C take place in the main computer system 306 of FIG. 4.

FIG. 6B is a flowchart 80 of the dialer placing call and the novel monitoring portion Steps 5-7 of the telephone dialing software message delivery system of FIG. 5. FIG. 6C is an overview of the entire flowchart process 90 of the novel telephone dialing software message delivery system invention of FIGS. 5 and 6A-65B. Referring to FIGS. 6B-6C, the fifth Step 500 receives by line 76 the telephone number and database information from the dialer program 70 and a dialer places the severe storm warning call and begins monitoring the call status. Two outputs can be the result of the fifth Step 500, either the call connects 505, or the dialed call doesn't connect 595. Any call, which does not result in the telephone being answered by either a live person or a telephone answering machine, is considered a "Non Connect". Examples of non connected calls are those resulting in Busy, No answer, No Ringand Operator Interrupts. If no connect, then the seventh Step 700 occurs where the system compiles the Call Stats and sends information to database 250 via link 150 and the line 800 prepares for the next call back to first Step 100.

Referring back to both FIGS. 6B and 6C, if a call connects via either path 510 or 515 what occurs will now be explained in detail. Under 510, an answering machine can be detected via background noise. The CT hardware of the computer 306 of FIG. 4 can detect an answering machine by analyzing the frequency of the background noise present in the called party's voice response and compares it to a profile of the background noise typical of recorded messages. If the CT hardware determines the presence of an answering machine in this manner, or in any other manner proprietary to the specific CT hardware, it communicates this information to the novel system (via the Custom control software) and the novel part of the Dialer program 70 responds. If the hardware 20 does not detect an answering machine via its' built in detection, then the software in the Dialer program 70 determines whether the call is connected to a live person or an answering machine by analyzing the length (time) of the cadence of the voice which answered the telephone. The typical voice cadence of a live person is much shorter than that of an answering machine. For example a live person answers the telephone generally in one of the following ways: "Hello?" (followed by silence), "Hello, Smith Residence" (followed by silence), "ABC Enterprises . . . how can I direct your call?" (followed by silence). In all of these cases, the spoken words occur for a very brief period of time (less than three seconds), followed by a period of silence. In the case of a typical answering machine, the length of continuous human sound prior to a period of silence is much greater. An example of a typical answering machine message is "Thank you for calling the Smith Residence, we're not home right now, but if you leave a message after the tone we will call you back as soon as we can. Thank you for calling, and have a great day" (followed by silence). After analyzing the cadence the RealCall invention will have determined whether the call has reached an answering machine or reached a live person. The novel software system will then proceed to take the appropriate action.

From the answering machine substep 510 shown in FIGS. 6B and 6C, the next substep is to begin analyzing the call 530. From analyzing call substep 530, either a solid non human tone is detected for a minimum duration of 1 second substep 535 or silence is detected for a minimum duration of 2 seconds in substep 555.

Substeps 535 and 555 encompass the heart of the RealCall preferred telephone system for sending out severe storm warning messages. In order to have reached step 530, the system must have determined it has reached an answering machine. The RealCall invention, i.e., the preferred telephony system 30 of FIG. 1, now must try to determine the appropriate time to launch the prerecorded message. To 'analyze' the call, the invention begins to RECORD the answering machine. The novel program only has instructions to stop recording under two conditions: (1) if it "hears" the presence of a solid, non human tone lasting at least one second in length (substep 535), or (2) it hears no sound for at least two continuous seconds (substep 555). A solid non-human tone (substep 535) would be typical of a "BEEP" indicating that machines readiness to begin recording. However, since many answering machines play "BEEP" tones lasting less than one second, the two seconds of silence (substep 540) will act as a safety measure to insure that playback begins if the novel software does not recognize the "BEEP" indicator (substeps 540 and 560). Additionally, many answering machines play a succession of "beeps" to indicate the number of unplayed messages currently residing on the system. The $2^{nd}$ stage of continued analysis (substep 540) insures that the recording does not begin while the answering machine is still playing a series of "beep" tones.

During testing of the—procedure described above and further defined in parent patent application Ser. No. 09/124,697 to the same assignee and same inventor as that of the subject invention which is incorporated by reference, simply identifying a "BEEP" (535) or two seconds of silence (555) did not indicate the moment when the answering machine begins recording with any high degree of accuracy. The reasons for the inaccuracy stems from many factors including: (1) machines which play multiple "BEEPS" before recording starts, (2) machines which play on-hold music (solid, non human tones) while preparing to record, (3) Outgoing messages (OGMs) which contain periods of silence after the end of the messages but prior to the announcing of a "beep" tone indicating the start of recording (this usually is the result of the owner of the answering machine who records their OGM and then cannot stop the recording immediately after recording their script).

In order to obtain a higher degree of accuracy as to the moment recording begins, the RealCall procedure uses a dual alternative two-step tier. If the system had previously identified an initial "BEEP" (solid non-human noise (step 535)), the invention then begins re-recording the call, this time with instructions to end recording only after a period of two continual seconds of silence (sub step 540). This logic believes that a "BEEP" or the playing of music has already occurred, and now the system is searching for the indication of recording, which will be evidence by silence. Consequently, if the first tier analysis terminated for the presence of two seconds of silence (sub step 555), the second tier analysis will simply test for another period of at least one second of additional silence (sub step 560) before launching. In this situation, the second tier search for additional silence eliminates false recording detection in situations where an OGM plays a period of silence prior to playing a "BEEP". Testing of the RealCall procedure has determined that adding the second tier of analysis has increased overall accuracy in determining the proper moment to begin playback by over 75% over current systems described in the prior art section of this invention.

As mentioned above, from substep 535 (in FIGS. 6B and 6C), the system continues analyzing the call until there is silence for 2 seconds (substep 540). After which from substep 540, the sixth Step 600 occurs where the system plays the recorded information file message, followed by the system disconnects the call substep 650 and the seventh Step 700 where the system compiles Call Stats and sends information to database 250 via Link program 150 and substep 800 which prepares the system for the next telephone number and the first Step 100.

As previously mentioned, the other path from Begin Analyzing Call substep 530, is if silence is detected (2 sec) 555. From substep 555, the next sub step is to Continue Analyzing Call Until Silence for 1 second, sub step 560. From substep 560, the sixth Step 600 has the system play the recorded information file, followed by the system disconnect substep 650 and the seventh Step 700 where the system compiles Call Stats (previously described) and sends the Stats information to database 250 via Link program 150 and substep 800 which prepares the system for the next telephone number and the first Step 100.

Referring to FIGS. 6B-6C, the Call Connects 505 passes through substep 515 when cadence or voice is detected. Next the system tests the length of the connect, substep 520. If an AM (answering machine) Connect is indicated by a cadence length greater than 3 seconds, substep 525, then the system begins analyzing the call to determine the appropriate time to play the message, substep 530, and the substeps 535 and 555 are checked as previously described. ANI connect refers to Answering Machine Connect, or a call which has connected to an answering machine, as opposed to calls which are connected to live persons.

Referring to FIGS. 6B-6C, if the test length of connect identifies a Live Connect as indicated by a cadence length of less than 3 seconds substep 575, then the system goes to the sixth Step 600 where the system plays the recorded information message immediately, and so forth as previously described.

Figure 7:
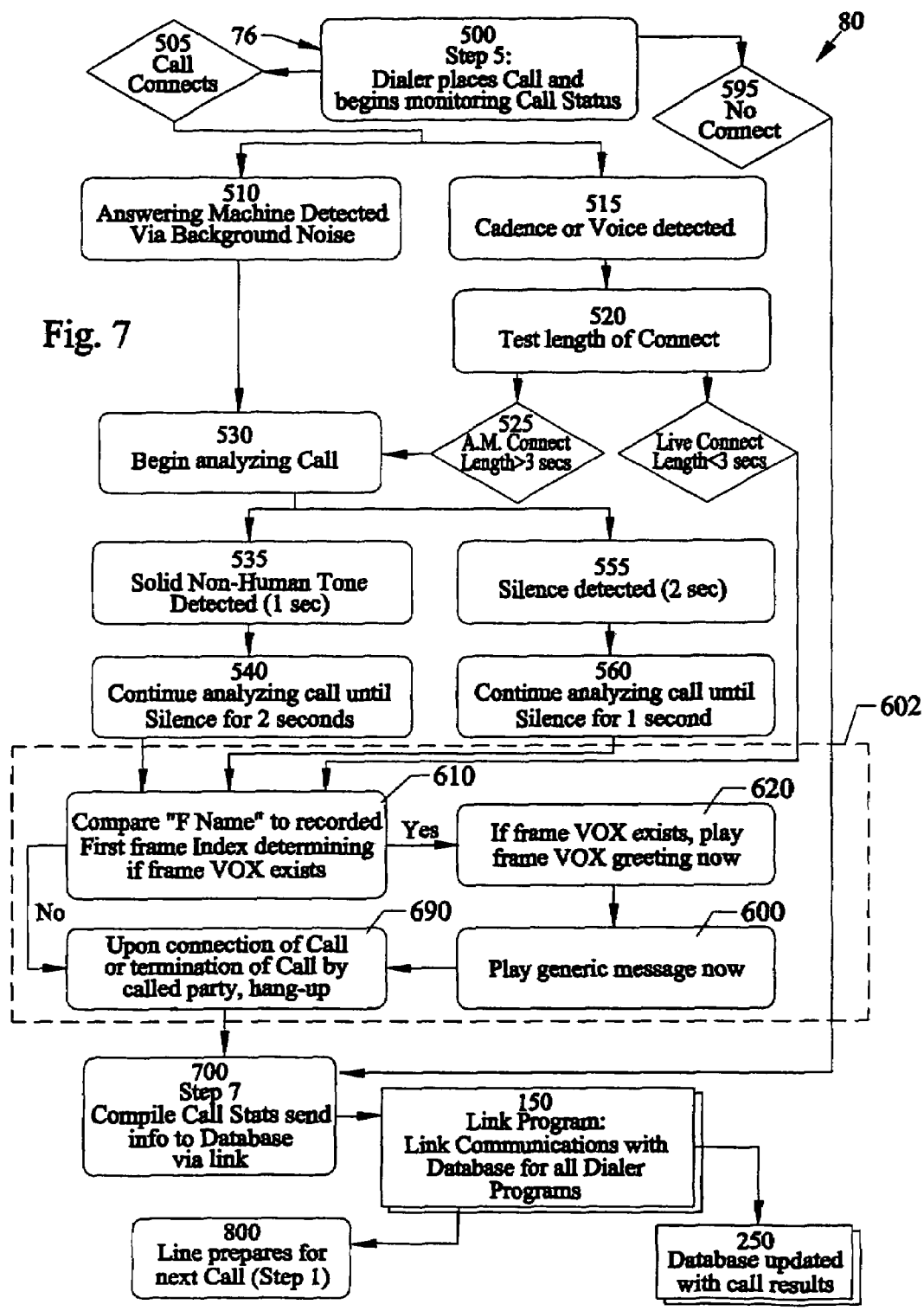
FIG. 7 is a second embodiment flowchart of modifying the flow play of recording step 600 of FIGS. 6B and 6C to personalizing a pre-face message prior to the pre-recorded message.

FIG. 7 is a second embodiment flowchart of modifying the play the recording step 6, (also indicated as 600 on FIG. 5) of the first embodiment for personalizing a message directed to the subscriber by including a personalized introduction greeting that states the call recipient's first name, followed immediately by the generic pre-recorded severe storm warning message as shown at 602. FIG. 7 shows an alternative step 6 to that depicted in FIG. 6B. New step 6 has two preliminary steps 610, 620 before playing the generic pre-recorded message 600. Referring to FIG. 7, step 610, takes the name of the subscriber being called and compares it to an index of all personalized first name greetings available (substep 610) from the database 308 If a personalized first name greeting message exists that matches the first name of the subscriber the personalized greeting message will be played first (substep 620), followed immediately by the generic pre-recorded severe storm warning message, step 600. Both messages are played in succession onto the answering machine followed by step 690, where upon completion of the call, or termination by the called party hanging up, step7, 700 and the remaining steps 150, 250 and 800 are completed. If there is no subscriber name available in the pre-recorded database at step 610, the invention skips to step 600 and plays the generic pre-recorded message onto the answering machine, followed by step 690, 700, 150, 250 and 800 as previously described.

Figure 8:
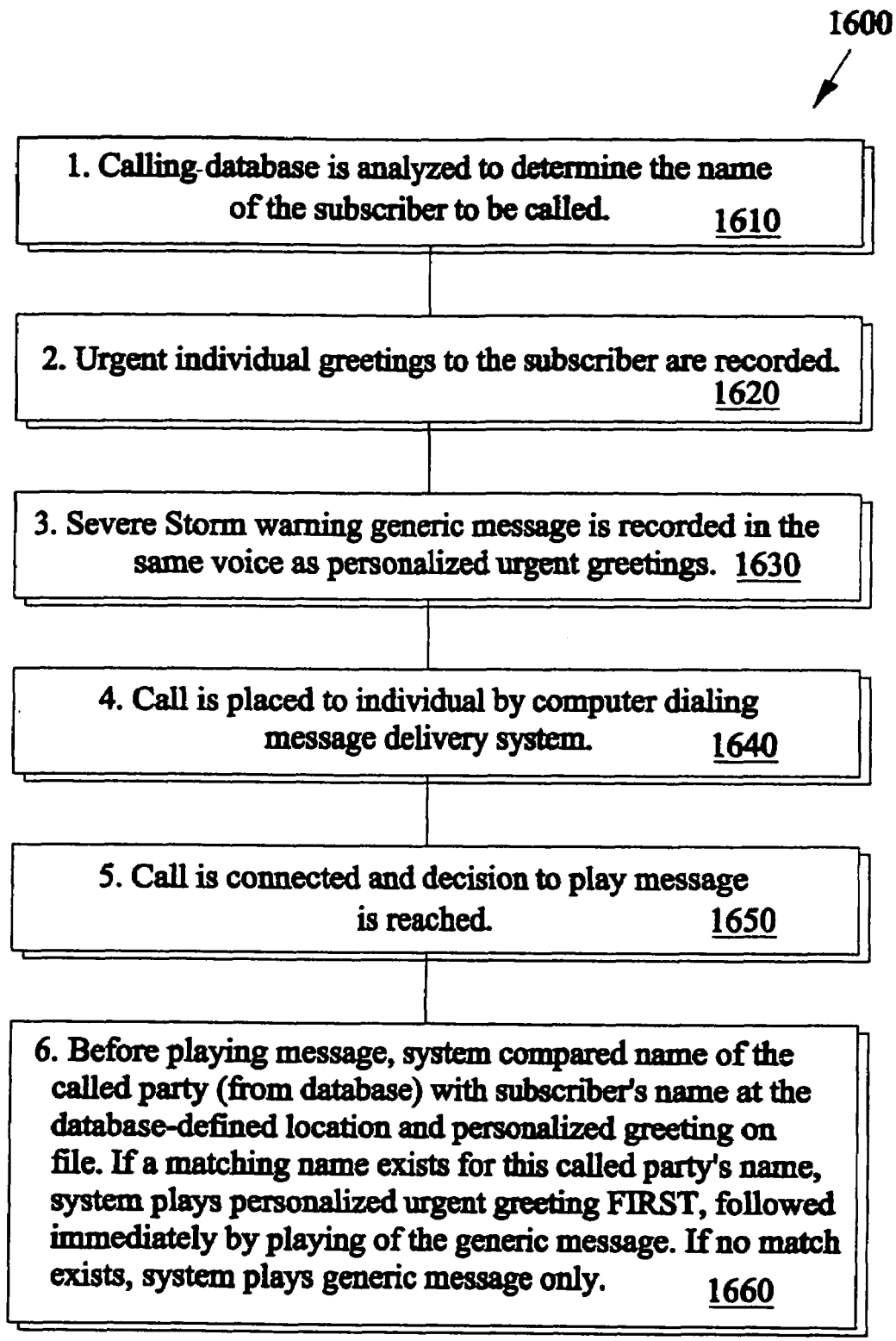
FIG. 8 shows the six sub-step flowchart for the novel for the personalized pre-face message step of FIG. 7.

FIG. 8 shows the six sub-step flowchart 1600 for the novel personalized pre-face message step of FIG. 7. Personalized prefacing is used to enhance prerecorded message delivery systems such as the RealCall message delivery system shown and described in the first embodiment, as well other computerized prerecorded message delivery systems. Personalized prefacing allows each prerecorded message to be initiated with a personalized greeting such as but not limited to "Hello Bill . . . " followed by a generic pre-recorded severe storm-warning message recorded in the same voice as the personalized greeting such as but not limited to "This is a ThunderCall severe weather warning call". When used in conjunction with the RealCall embodiment or other systems capable of delivering and leaving recorded messages on answering machines, the personalized preface invention enhances the perception by the call recipient that the warning message was left by a live person, instead of by a computer.

Under the first substep 1 of FIG. 8 identified as 1610, a subscriber location database is analyzed to determine the names of all subscriber residing in the subscriber database. Under the next substep 1620, a personalized greeting is recorded for each of the most frequently occurring first names existing in the subscriber database.

The personalized greeting should be recorded using the same human voice that records the generic information message being delivered to the call recipients, so that the two messages (the preface and the generic message) can later be seamlessly merged by the system into what appears as one continuous personalized message.

Under sub step 1630 in FIG. 8, once personalized greeting messages for the selected subscriber's names have been stored, the generic message is recorded in the same voice as that of the preface personal greeting. Under sub step 1640, calls warning of the forthcoming severe storm to subscriber's home and/or location are now placed to the subscriber by the computer dialing message delivery system. At the point in the call processing when the RealCall system is ready to play the severe storm warning message, the system determines whether a personalized message exists matching the first name of the subscriber identified for that location as indicated in step 5 (also noted as 1650).

If the invention does not find a personalized greeting recording matching the subscriber's name, then the program simply launches the generic message without the personalized urgent greeting. If the invention does find a personalized greeting recording matching the subscriber's name, then the program will first play the personalized greeting message followed immediately by the generic warning message.

FIG. 9 illustrates a sample generic message script sent out to subscribers warning of a tornado approaching the subscriber's location.

Although the preferred embodiments described under embodiment two above encompasses sending the combined personalized preface greeting and generic message to answering machines, the invention can be used with applications where the call recipient does not have an answering machine, but instead picks up their phone live.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. An automated system for delivering severe weather warnings to live persons and automated telephone answering machines, comprising:

means for forming a subscriber database in a selected geographical region, consisting of names and related telephone numbers to each of the names in the database;

means for forming a name database of first names of the names of the subscriber database having a greatest frequency of occurrence;

means for recording individualized first name personalized greeting to the first names having the greatest frequency of occurrence in the subscriber database;

means for capturing a NWS (National Weather Service) Bulletin reciting a location of a severe storm;

means for validating a relevant Bulletin into a Valid Bulletin by determining from the storm's location and severity that the storm represents an imminent severe storm danger to at least one person of said name database;

means for combining each of the individualized first name personalized greeting with the Valid Bulletin;

means for placing a call to persons in the name database, within seconds of the release time of said NWS Bulletin to the danger of the storm;

means for detecting either an answering machine or a live voice signal from each of said telephone numbers; and means for delivering the combined individualized first name personalized greeting followed by the Valid Bulletin to each of the persons in the name database in a nontruncated form, wherein said Valid Bulletin is continuously delivered to both answering machines and to live persons in a nontruncated form.

2. The system of claim 1, wherein the detecting means includes:

means for alternatively determining if an answering machine noise signal emission is detected over a first time period or a silence response is detected over a second time period, the first time period being different from the second time period and if so then playing the message; and means for determining if a live cadence/voice signal is detected and if so then playing the message.

3. An automated method for delivering weather condition warnings to live persons and automated telephone answering machines, comprising the steps of:
- forming a subscriber database in a selected geographical region, consisting of names and telephone numbers to each of the names in the database;
- forming a name database of first names having a greatest frequency of occurrence from the subscriber database;
- recording individualized first name personalized greeting for each first names having the greatest frequency of occurrence,
- capturing a NWS (National Weather Service) Bulletin reciting the location of a severe storm;
- validating a relevant Bulletin into a Valid Bulletin by determining from the storm's location and severity that it represents an imminent severe storm danger to at least one person of said name database;
- recording an individual first name personal urgent warning greeting to intended recipients of the Valid Bulletin;
- combining each of the individualized first name personalized greetings with a generic severe storm warning message for said recipient to form combined messages which includes the Valid Bulletin;
- placing a call to persons in the name database;
- detecting either an answering machine or a live voice signal from each of said telephone numbers; and
- playing the combined first name personalized greeting with the weather condition message to the persons in the name database in a nontruncated form, wherein the non-truncated form message is played on each answering machine and to each live person in the name database.

4. The method of claim 3, wherein the detecting step includes the steps of:
- alternatively determining if an answering machine noise signal emission is detected over a first time period or a silence response is detected over a second time period, the first time period being different from the second time period and if so then playing the message; and
- determining if a live cadence/voice signal is detected and if so then playing the message.

5. A computer based system for delivering severe weather warnings continuously in a non-truncated form as a personalized information message via an automated dialing system to automated recorders, comprising:
- a subscriber database of names with their respective geographic locations;
- a name database of first names based on the names in the subscriber database having the greatest frequency of occurrence;
- a determinator for determining frequency of occurrence of a greatest number of the first names in the name database;
- a recorder for recording individualized first name personalized greetings to each of the first names in the subscriber database having the greatest frequency of occurrence;
- a capturer for capturing a NWS (National Weather Service) Bulletin reciting location of a severe storm;
- a validator for validating a relevant Bulletin into a Valid Bulletin by determining from the location and severity of the severe storm that represents an imminent severe storm danger to at least one person of said name database;
- a second recorder for recording an individual first name personal urgent warning greeting to intended recipients of the Valid Bulletin;
- a combiner for combining each of the individualized first name personalized greetings in the name database with a generic severe storm warning for said intended recipients to form combined messages which includes the Valid Bulletin;
- a deliverer for delivering the combined messages to answering machines of the names of the name database; and
- a player for playing the combined messages in a nontruncated form on each of the answering machines of the first names in the name database having the greatest frequency of occurrence.

* * * * *